US007536308B2

(12) United States Patent
Hodges et al.

(10) Patent No.: US 7,536,308 B2
(45) Date of Patent: May 19, 2009

(54) METHODS FOR PROVIDING COMMUNICATIONS SERVICES

(75) Inventors: Donna K. Hodges, Cumming, GA (US); Barrett Morris Kreiner, Norcross, GA (US); Steven N. Tischer, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 907 days.

(21) Appl. No.: 10/720,946

(22) Filed: Nov. 24, 2003

(65) Prior Publication Data

US 2005/0114156 A1 May 26, 2005

(51) Int. Cl.
*G06Q 99/00* (2006.01)
(52) U.S. Cl. .............................. 705/1; 705/11; 705/34; 709/203; 709/223; 709/227; 455/161.2; 455/161.3; 455/434; 455/456.3
(58) Field of Classification Search .................. 705/1, 705/400, 64, 201, 5, 20, 26; 455/405–406, 455/414, 433, 161.2, 161.3, 434, 456.3; 709/223, 709/203, 227
See application file for complete search history.

(56) References Cited

U.S. PATENT DOCUMENTS

| 5,752,186 | A | * | 5/1998 | Malackowski et al. | ... 455/414.1 |
| 5,790,176 | A |   | 8/1998 | Craig | |
| 5,862,471 | A | * | 1/1999 | Tiedemann et al. | ......... 455/406 |
| 5,978,780 | A | * | 11/1999 | Watson | ........................ 705/40 |
| 6,002,689 | A |   | 12/1999 | Christie | |
| 6,016,307 | A |   | 1/2000 | Kaplan | |
| 6,058,301 | A |   | 5/2000 | Daniels | |
| 6,104,718 | A |   | 8/2000 | Christie | |
| 6,178,170 | B1 |   | 1/2001 | Duree | |
| 6,263,358 | B1 | * | 7/2001 | Lee et al. | ..................... 718/100 |
| 6,272,343 | B1 | * | 8/2001 | Pon et al. | ..................... 455/434 |
| 6,285,871 | B1 | * | 9/2001 | Daniels | ....................... 455/411 |
| 6,385,198 | B1 |   | 5/2002 | Ofek | |
| 6,456,594 | B1 |   | 9/2002 | Kaplan | |
| 6,516,194 | B2 | * | 2/2003 | Hanson | ...................... 455/433 |
| 6,519,693 | B1 |   | 2/2003 | Debey | |
| 6,522,883 | B2 |   | 2/2003 | Titmuss | |
| 6,567,375 | B2 |   | 5/2003 | Balachandran | |
| 6,738,815 | B1 | * | 5/2004 | Willis et al. | ................. 709/225 |
| 6,836,652 | B2 | * | 12/2004 | Arima et al. | ................ 455/407 |

(Continued)

FOREIGN PATENT DOCUMENTS

WO   WO 00/41426   7/2000

OTHER PUBLICATIONS

O'connell, Brian, "Around the World With Global Network", Oct. 1993, DEC Professional, v12, n10, p. 38(6).*

(Continued)

*Primary Examiner*—John W. Hayes
*Assistant Examiner*—Freda A. Nelson
(74) *Attorney, Agent, or Firm*—Scott P. Zimmerman, PLLC

(57) ABSTRACT

Methods, systems, and products are disclosed for providing communications services. One method receives a request for communications service. The request for communications service originates from a client communications device, and the request for communications service is communicated to a service provider of a communications network. A preferred scenario of segmentation, dispersion, and assemblage of electronic data is dynamically ascertained to fulfill the request. The method then bills for the communications service.

20 Claims, 9 Drawing Sheets

U.S. PATENT DOCUMENTS

| | | |
|---|---|---|
| 6,934,530 B2 * | 8/2005 | Engelhart .................... 455/406 |
| 7,065,496 B2 * | 6/2006 | Subbloie et al. ................ 705/11 |
| 7,155,517 B1 * | 12/2006 | Koponen et al. ............ 709/227 |
| 7,289,489 B1 * | 10/2007 | Kung et al. .................. 370/352 |
| 2001/0029544 A1 | 10/2001 | Cousins |
| 2002/0058532 A1 * | 5/2002 | Snelgrove et al. ........... 455/557 |
| 2002/0112060 A1 | 8/2002 | Kato |
| 2002/0164018 A1 | 11/2002 | Wee |
| 2002/0176378 A1 * | 11/2002 | Hamilton et al. ............ 370/328 |
| 2003/0012376 A1 | 1/2003 | Wee |
| 2003/0043815 A1 | 3/2003 | Tinsley |
| 2003/0088778 A1 | 5/2003 | Lindqvist |
| 2003/0100315 A1 * | 5/2003 | Rankin ........................ 455/456 |
| 2003/0233332 A1 * | 12/2003 | Keeler et al. ................... 705/64 |
| 2004/0160932 A1 * | 8/2004 | Yegoshin ..................... 370/338 |
| 2004/0249927 A1 * | 12/2004 | Pezutti ........................ 709/223 |
| 2006/0058010 A1 * | 3/2006 | Williams et al. ......... 455/414.1 |

OTHER PUBLICATIONS

Greene, William; "Sample Selection in Credit-Scoring Models", Mar. 31, 1998, pp. 299-316, 18 pgs.*

* cited by examiner

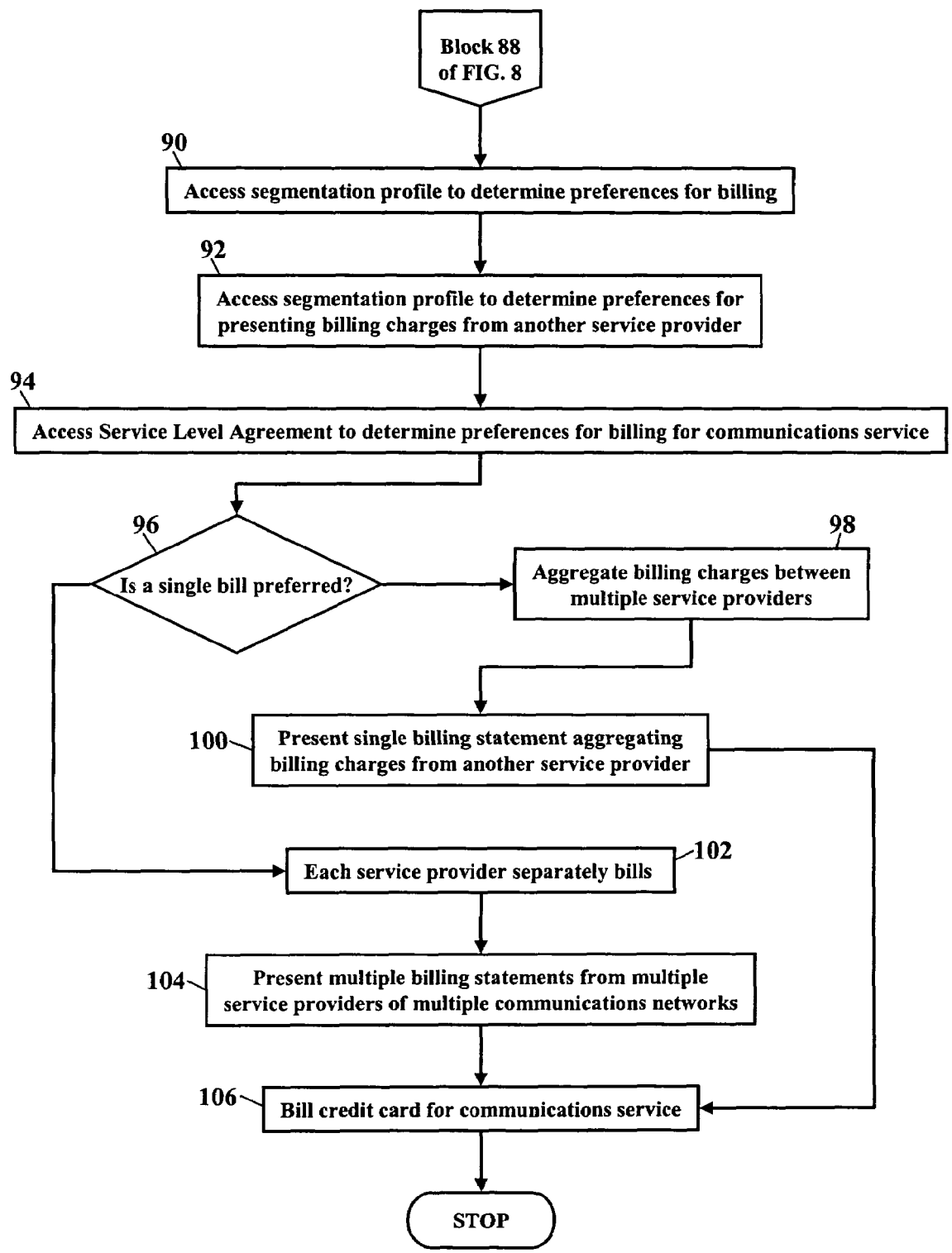

METHODS FOR PROVIDING COMMUNICATIONS SERVICES

CROSS-REFERENCE TO RELATED APPLICATIONS

This application relates to the copending and the commonly assigned U.S. application Ser. No. 10/720,941, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,949, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,586, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,800, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,780, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,956, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,587, entitled "Methods for Providing Communications Services", filed concurrently herewith, and of which the "Brief Summary of the Invention" section and the "Detailed Description of the Invention" section are incorporated herein by reference.

This application relates to the copending and the commonly assigned U.S. application Ser. No. 10/720,892, entitled "Methods for Providing Communications Services", filed concurrently herewith, and of which the "Brief Summary of the Invention" section and the "Detailed Description of the Invention" section are incorporated herein by reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to computers and to communications and, more particularly, to processing data in a communications network.

2. Description of the Related Art

Manipulation of electronic data is important in computer networking and in communications. Often times electronic data must be manipulated for presentation at a client communications device. That is, the electronic data must be changed, formatted, or altered to suit the display characteristics, processing abilities, and/or storage capabilities of the client communications device. A handheld personal data assistant, for example, often requires that bandwidth-intensive electronic data, such as on-demand video, be scaled, color corrected, and/or otherwise manipulated for optimum presentation on the small display of the handheld personal data assistant. Heretofore, however, manipulation of electronic data was usually the responsibility of the client communications device—that is, the client communications device stores and utilizes one or more computer programs to manipulate incoming electronic data for presentation on the client communications device.

Locally manipulating electronic data, however, poses problems. As the electronic data is received, the client communications device must store the electronic data, process/manipulate the electronic data, and present the manipulated electronic data to the user. This process of storing, manipulating, and/or presenting the electronic data, however, often taxes the limited processing and storage capabilities of the client communications device. As both those skilled and unskilled recognize, when the processing and/or storage capabilities of the client communications device are overwhelmed, the audio/video presentation may "stumble" and degrade the user experience. Sometimes the client communications device even experiences a fault or failure when the processing and/or storage capabilities are overwhelmed. There is, accordingly, a need in the art for methods and systems of manipulating electronic data that reduce the need for locally-stored computer programs and that reduce the need for local processing requirements.

BRIEF SUMMARY OF THE INVENTION

The aforementioned problems, and other problems, are reduced by an Analysis Module. This Analysis Module comprises methods, computer systems, computer programs, and computer program products that provide communications services. The Analysis Module manages optimum routing scenarios amongst various and multiple communications networks. These various and multiple communications networks, however, may utilize dissimilar billing scenarios. Each time a user requires communications service, the Analysis Module analyzes the user's communications needs to determine available network routing, network bandwidth, speed, the capabilities of the client communications device, and the availability of multi-grid assets (such as reassembly and delivery capabilities of edge assemblers in any of the communications networks). Once the communications path(s) and communications networks are determined for data segmentation, manipulation, and aggregation, this invention manages how each of the communications networks bill and/or collect payment for the provided communications service(s). Because this invention is dynamic, the billing scheme may change each time communications services are provided.

This invention discloses methods, systems, and products for providing communications services. One of the embodiments describes a method for providing communications services. This method receives a request for communications service. The term "communications service" means uploading and/or downloading data and/or voice signals via a communications network. The request for communications service originates from a client communications device, and the request for communications service is communicated to a service provider of a communications network. A preferred scenario of segmentation, dispersion, and assemblage of electronic data is dynamically ascertained to fulfill the request. The method then bills for the communications service.

Another of the embodiments describes a system for providing communications services. The system includes an Analysis Module stored in a memory device, and a processor communicates with the memory device. The Analysis Module receives a request for communications service. The request for communications service originates from a client communications device and is communicated to a service provider of a communications network. The Analysis Module dynamically ascertains a preferred scenario of segmentation, dispersion, and assemblage of electronic data to fulfill the request. The Analysis Module then bills for the communications service.

Other embodiments of this invention describe a computer program product. A computer-readable medium stores an Analysis Module. The Analysis Module receives a request for communications service. The request for communications service originates from a client communications device and is communicated to a service provider of a communications network. The Analysis Module dynamically ascertains a preferred scenario of segmentation, dispersion, and assemblage of electronic data to fulfill the request. The Analysis Module then bills for the communications service.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments of the present invention are better understood when the following Detailed Description of the Invention is read with reference to the accompanying drawings, wherein:

FIGS. 8 and 9 are flowcharts illustrating a method of providing communications service.

DETAILED DESCRIPTION OF THE INVENTION

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 1:
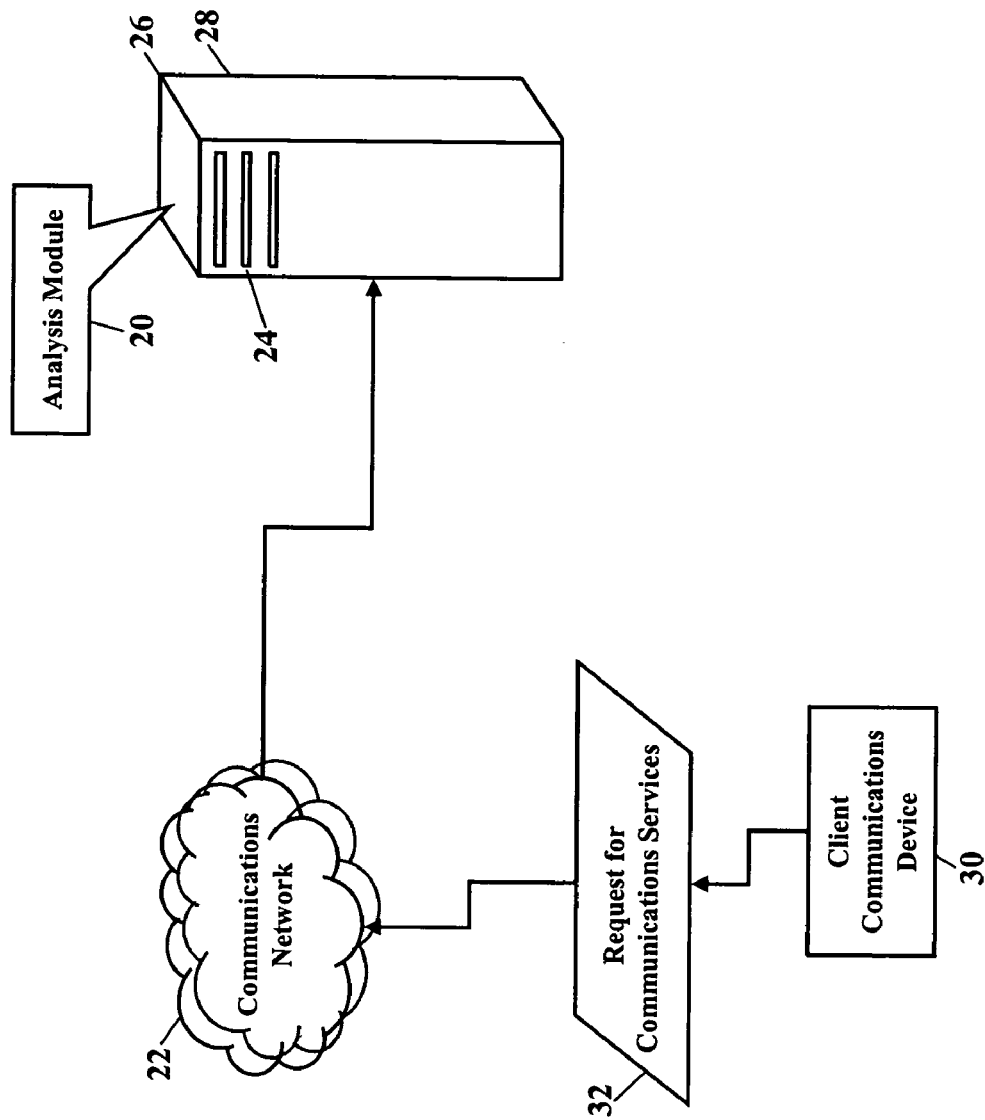
FIG. 1 is a schematic illustrating an Analysis Module, according to one of the embodiments of this invention.

FIG. 1 is a schematic illustrating an Analysis Module 20, according to one of the embodiments of this invention. The Analysis Module 20 manages optimum routing scenarios amongst various and multiple communications networks. These various and multiple communications networks, however, may utilize dissimilar billing scenarios. The Analysis Module 20 operates within a communications network 22. This communications network 22 represents just one of the possible operating environments for the Analysis Module 20. The Analysis Module 20 is stored within memory 24 of a computer device 26, such as a service provider's computer server 28 communicating with the communications network 22. When a user, using a client communications device 30, requires communications service, the client communications device 30 communicates a request 32 for communications service. The term "communications service" means uploading and/or downloading data via the communications network 22. The term "data" includes electronic information, such as, for example, facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, and/or (4) profiles associated with configuration, authenticity, security, and others.

The request 32 for communications service is received by the Analysis Module 20 via the communications network 22.

The Analysis Module 20 analyzes the user's communications needs to determine what data is requested, what network routing is available, how much network bandwidth is available, the speed at which the requested communications service(s) is required, and the capabilities of the client communications device 30. The Analysis Module 20, however, also analyzes the availability of multi-grid assets (such as the availability of routing/bandwidth of other communications networks and the reassembly and delivery capabilities of edge assemblers in any of these available communications network). Once the available communications path(s) and communications networks are determined, the Analysis Module 20 determines how data should be segmented, manipulated, dispersed, and aggregated to fulfill the request 32 for communications service.

Figure 2:
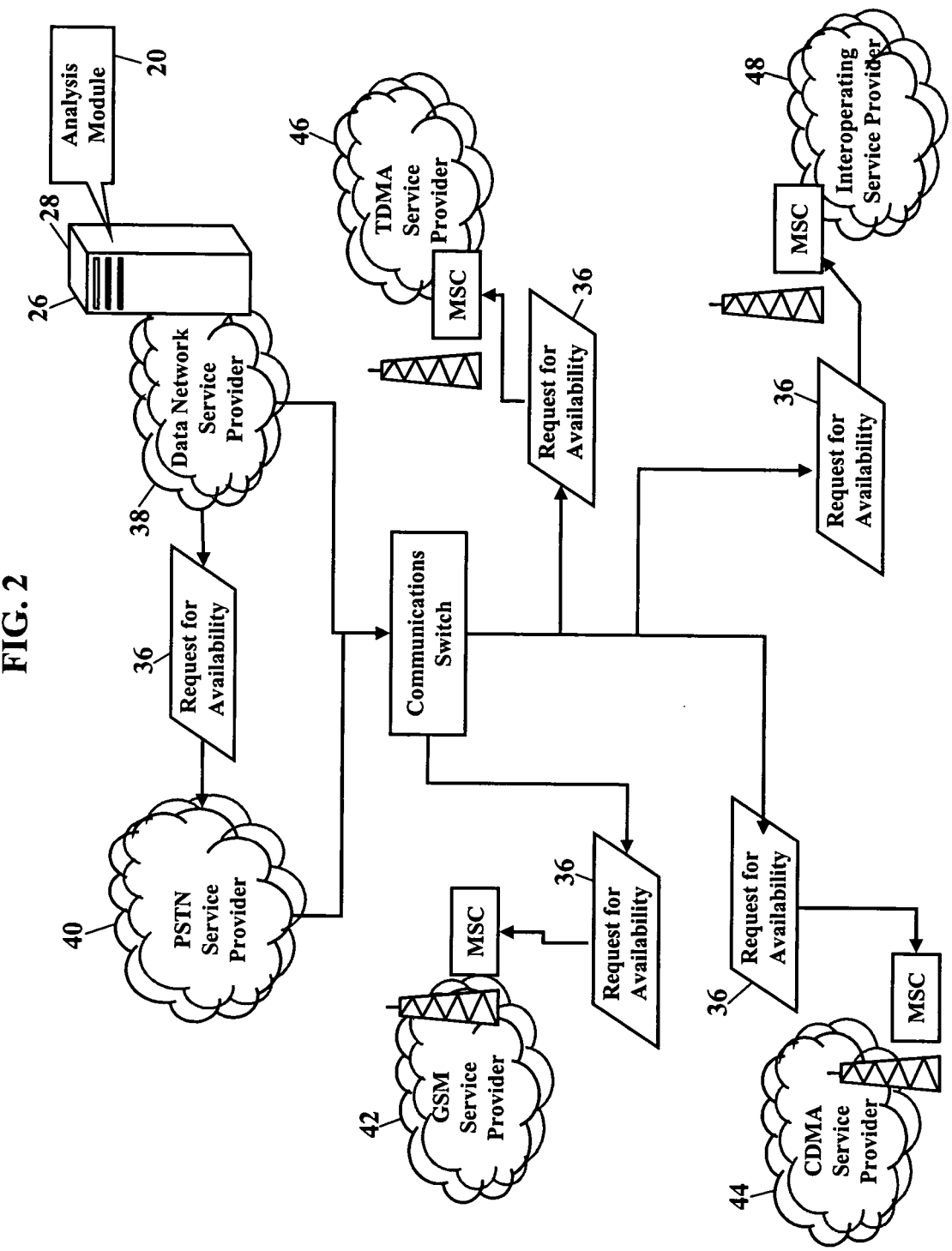
FIGS. 2 and 3 are schematics illustrating the multi-grid assets, according to more of the embodiments of this invention.
Figure 3:
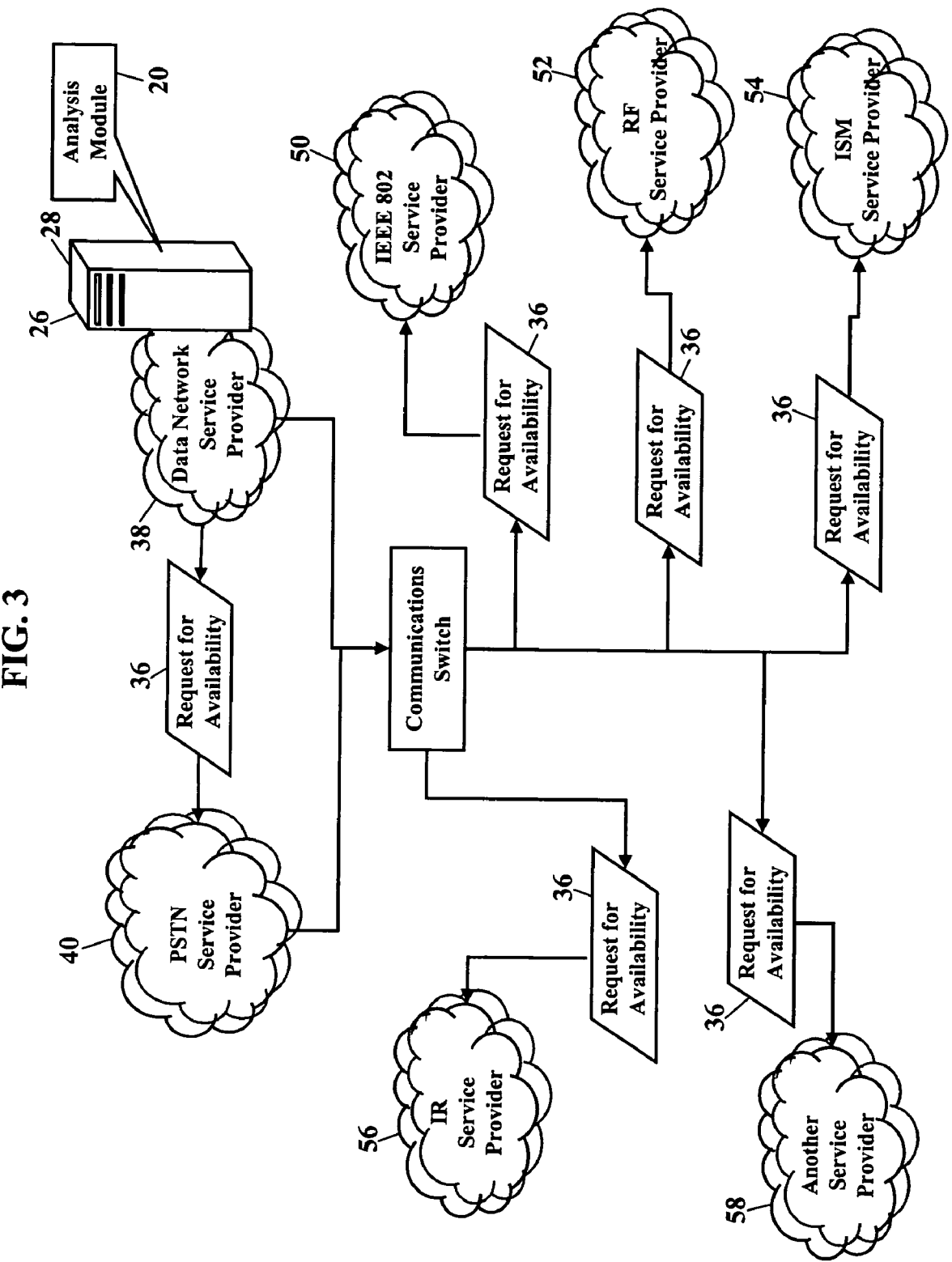

FIGS. 2 and 3 are schematics illustrating the multi-grid assets, according to more of the embodiments of this invention. When the client communications device (shown as reference numeral 30 in FIG. 1) requires communications service, the Analysis Module 20 analyzes the availability of one or multiple communications networks. The Analysis Module 20 communicates a request 36 for availability to other wireline and/or wireless communications networks. The request 36 for availability communicates from the Analysis Module 20 to one or more service providers of one or multiple communications networks. FIG. 2, for example, shows the Analysis Module 20 communicating the request 36 for availability to a data network 38 and/or the Public Switched Telephone Network 40. The Analysis Module 20 may also communicate the request 36 for availability to a GSM cellular network 42, a CDMA cellular network 44, a TDMA cellular network 46, and a GSM/CDMA/TDMA interoperating network 48 (such as a GSM-ANSI Interoperability Team (GAIT) network). As those of ordinary skill in the art recognize, the GSM cellular network 42 operates using the Global System for Mobile (GSM) communications technology standard, the CDMA cellular network 44 operates using a Code Division Multiple Access (CDMA) communications technology standard, and the TDMA cellular network 46 operates using a Time Division Multiple Access (TDMA) communications technology standard. Those of ordinary skill in the art also recognize that the GSM/CDMA/TDMA interoperating network 48 may operate using a GSM-ANSI Interoperability Team (GAIT) communications technology standard, a combination CDMA/GSM technology standard, and/or a combination TDMA/CDMA technology standard. FIG. 3, similarly, shows the Analysis Module 20 initiating the request 36 for availability to an I.E.E.E. 802 wireless network 50, an RF wireless network 52, an ISM wireless network 54, an IR wireless network 56, and another wireless network 58. The I.E.E.E. 802 wireless network 50 utilizes any of the I.E.E.E 802 family of wireless technology standards. The RF wireless network 52 uses the radio frequency (RF) portion of the electromagnetic spectrum, the ISM wireless network 54 uses the Industrial, Scientific, and Medical (ISM) band of the electromagnetic spectrum, the IR wireless network 56 uses the infrared (IR) portion of the electromagnetic spectrum, and the another wireless network 58 utilizes any other portion/frequency within the electromagnetic spectrum.

Figure 4:
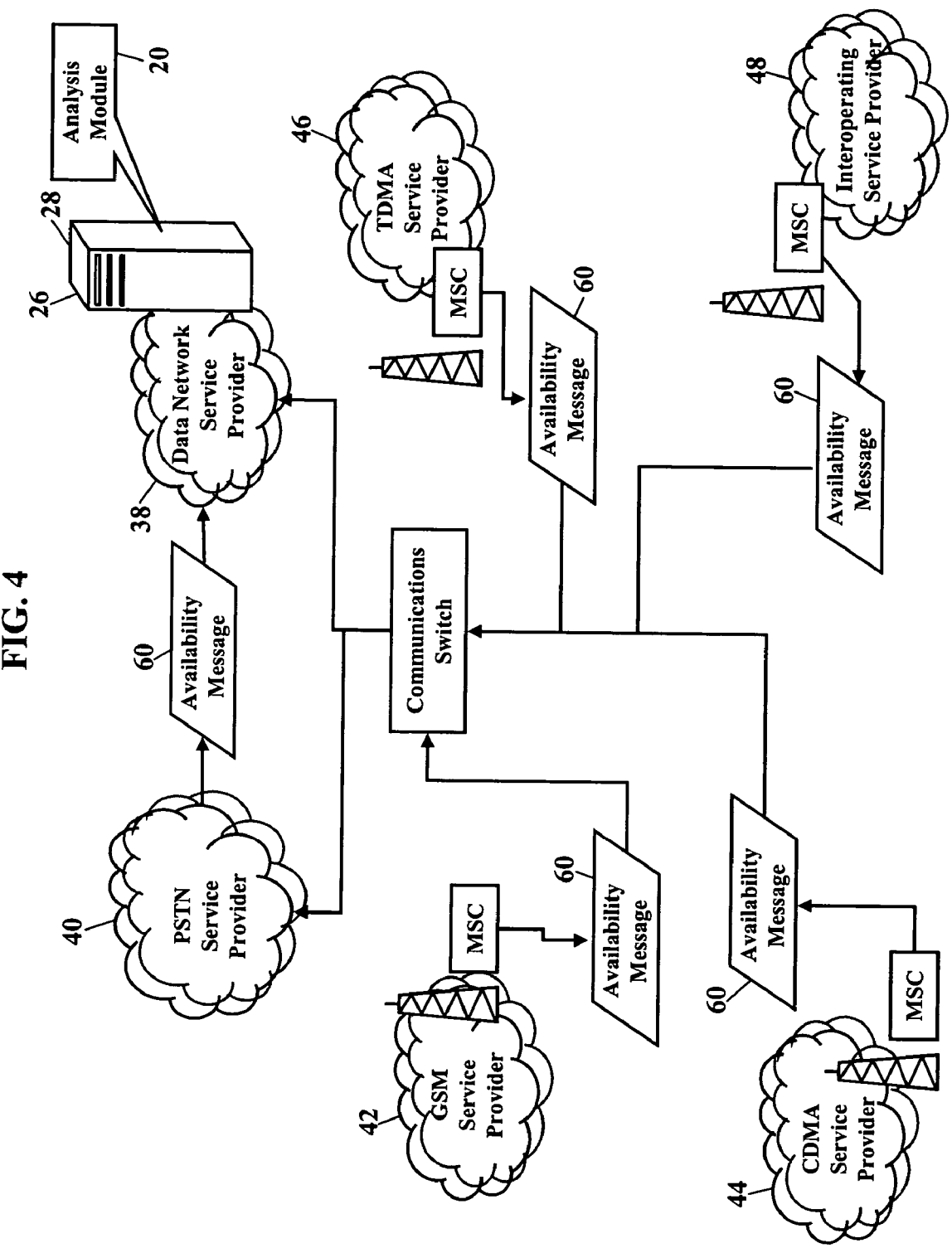
FIGS. 4 and 5 are schematics illustrating the availability of the multi-grid assets, according to still more embodiments of this invention.
Figure 5:
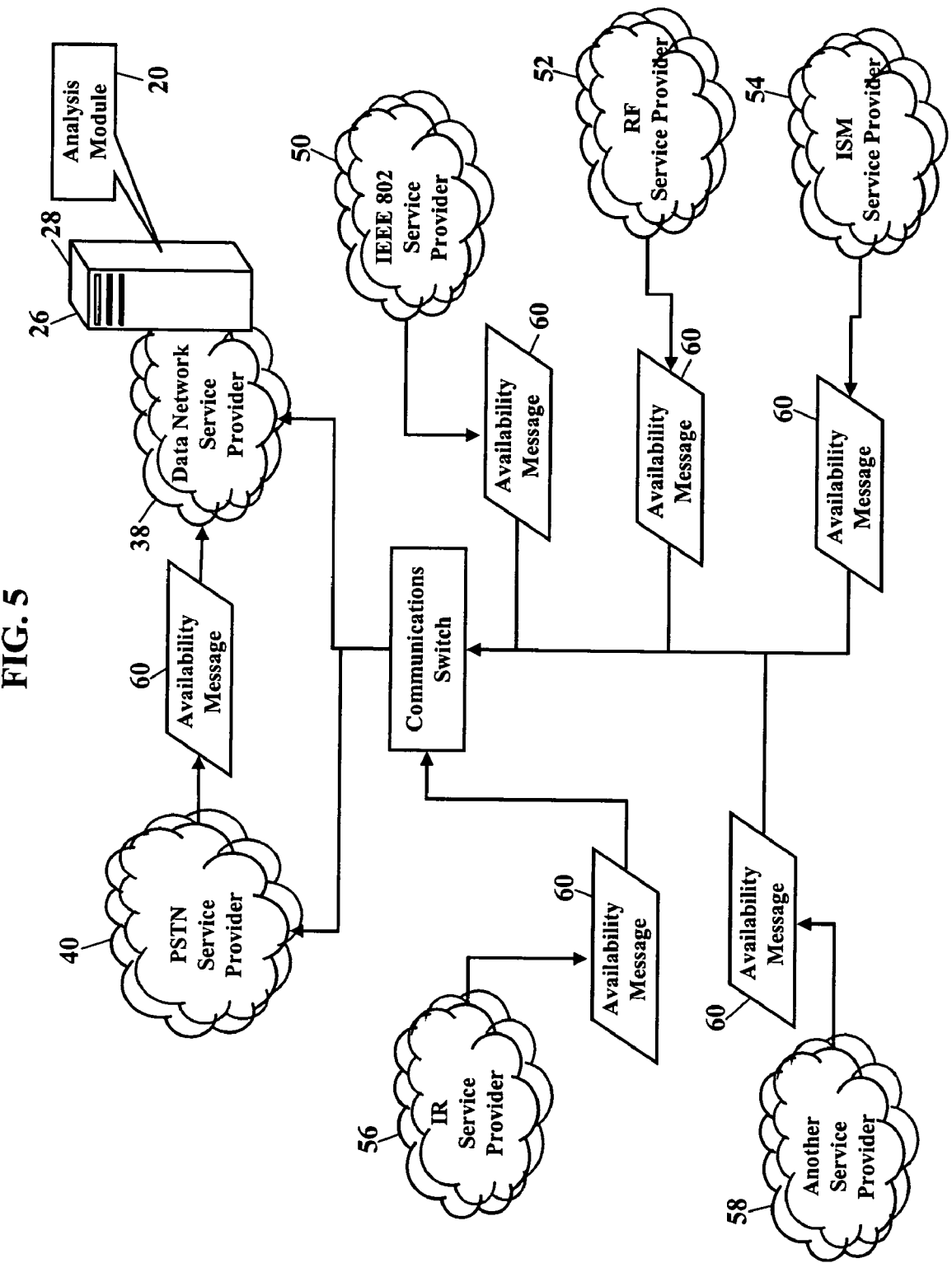

FIGS. 4 and 5 are schematics illustrating the availability of the multi-grid assets, according to still more embodiments of this invention. When the other wireline and/or wireless communications networks receive the request for availability (shown as reference numeral 36 in FIGS. 2 and 3), each communications network return communicates an availability message 60. The availability message 60 communicates from the one or more service providers of one or multiple communications networks to the Analysis Module 20. Each availability message 60 includes what routing paths are immediately available within the respective communications network, and what bandwidth is immediately available along each routing path. Each availability message 60 may also include the immediate reassembly and delivery capabilities of any edge assemblers within the respective communications network. Each availability message 60, however, may also include alternative availabilities. These alternative availabilities might include suggestions for cheaper rates, better performance, and/or higher quality communications services. If, for example, the user's communications needs are not immediate, a service provider might suggest an alternative time/date when better communications services are available. A service provider might suggest greater bandwidth is available during off-peak times. A cheaper rate might be available between midnight and 6 AM. A service provider might also offer greater bandwidth, perhaps with less probability of loss and/or distortion, if a slightly higher price is paid. Whatever the service provider's alternative suggestions, the Analysis Module 20 receives and analyzes each availability message 60.

Figure 6:
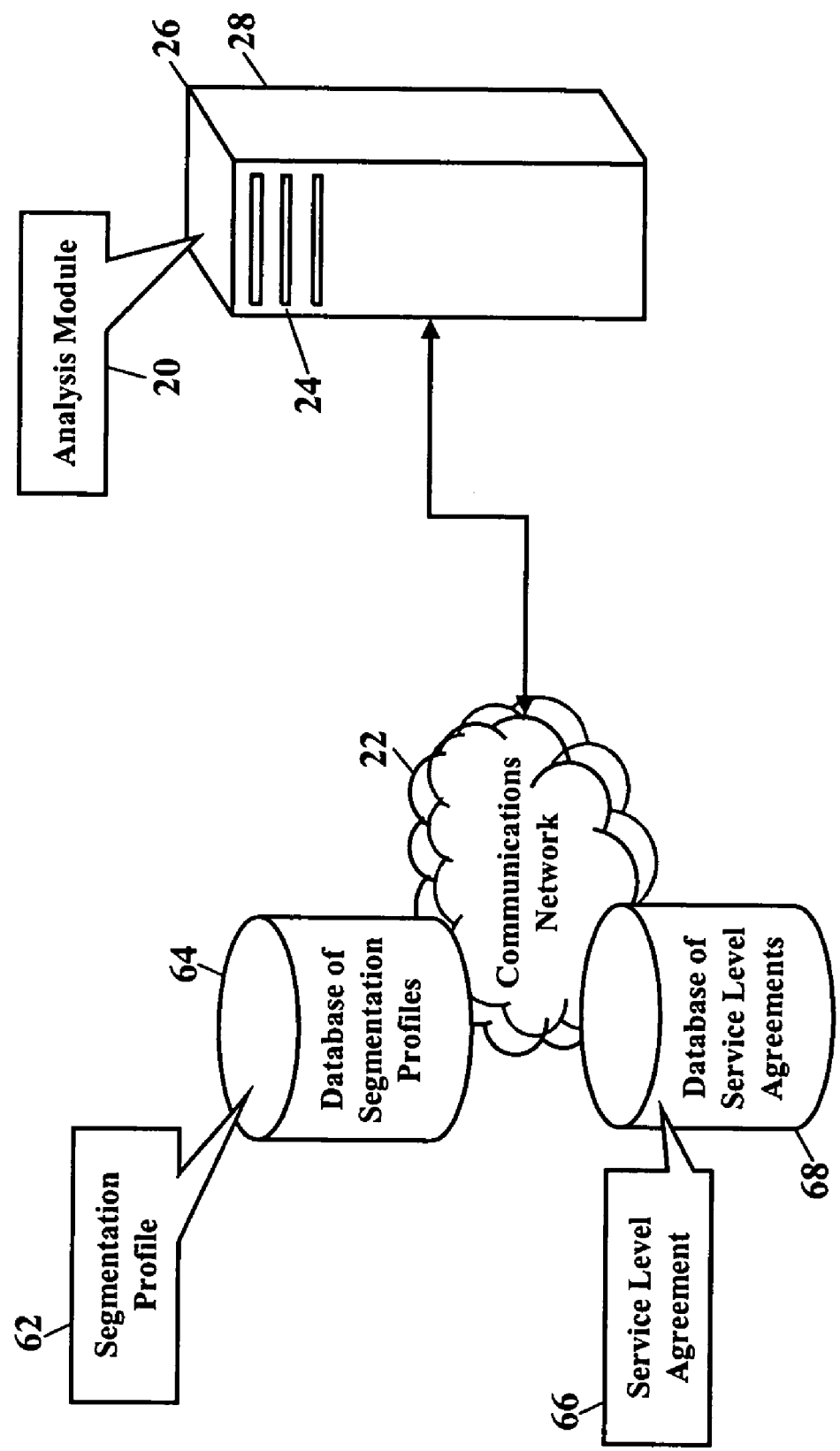
FIG. 6 is a schematic illustrating a segmentation profile and a Service Level Agreement, according to even more embodiments of this invention.

FIG. 6 is a schematic illustrating a segmentation profile 62 and a Service Level Agreement 66, according to even more embodiments of this invention. When the Analysis Module 20 receives each availability message (shown as reference numeral 60 in FIGS. 4 and 5), the Analysis Module 20 dynamically ascertains a preferred scenario of segmentation, dispersion, and assemblage of electronic data. The Analysis Module 20 analyzes each availability message, and the Analysis Module 20 determines how data should be optimally segmented, dispersed, manipulated, and then reassembled to fulfill the request for communications service (shown as reference numeral 32 in FIG. 1). The preferred scenario reflects the best-available routing, and/or the best-available transformation/formatting, that provides the requested communications service(s). When the Analysis Module 20 constructs the preferred scenario, the Analysis Module 20 may determine that competing communications networks, and/or competing service providers, offer advantageous quality, performance, and/or pricing. The Analysis Module 20 may dynamically negotiate amongst other service providers to fulfill the request for communications service.

The Analysis Module 20 may access a segmentation profile 62. The segmentation profile 62 is stored/maintained within a database 64 of segmentation profiles, and the segmentation profile 62 may contain preferences for preferring one service provider to another service provider. The segmentation profile 62 may alternatively or additionally contain preferences for preferring one communications network to another communications network. The segmentation profile 62 may alternatively or additionally contain preferences for preferring a highest-rated, or higher-rated, service provider to provide the communications service. That is, if an auction community provides ratings feedback, the segmentation profile 62 and/or the Analysis Module 20 may prefer higher/highest-rated service providers and/or higher/highest-rated communications networks.

The Analysis Module 20 may access a Service Level Agreement 66. The Service Level Agreement 66 is stored/maintained within a database 68 of Service Level Agreements, and the Service Level Agreement 66 is an agreement defining one or more parameters for the communications service(s) provided on behalf of the user. The Service Level Agreement 66 may be an agreement by and between the user and a service provider. The Service. Level Agreement 66 defines how the user wishes to receive data, in what format that data is delivered, when the data is delivered, and to what device (or along what network path) that data is delivered. The Service Level Agreement 66 might define pricing for various bandwidth needs, network utilization, delivery times, and processing charges. Because Service Level Agreements are, in general, known in the art, and because the content of the Service Level Agreement 66 may greatly vary, this patent will not further explain the Service Level Agreement 66.

Once the preferred scenario is known, the Analysis Module 20 then determines billing. Because the preferred scenario may utilize multiple communications networks, and perhaps even competing service providers of other communications networks, billing relationships may not be established. As those of ordinary skill in the art recognize, competing service providers may have dissimilar billing schemes, and these dissimilar billing schemes may not be immediately ascertainable. The Analysis Module 20, then, may determine and assemble billing rates amongst multiple communications networks and/or amongst competing service providers. The Analysis Module 20, additionally or alternatively, may access the segmentation profile 62 and/or the Service Level Agreement 66. The segmentation profile 62 may also contain preferences for billing for the communications service, and the segmentation profile 62 may also contain preferences for presenting billing charges from another service provider of another communications network. The Service Level Agreement 66, likewise, may contain/define preferences for billing for the communications service. The Analysis Module 20 preferably determines the billing relationships and calculates rates/charges before providing the requested communications service. The Analysis Module 20, however, may alternatively authorize/provide the requested communications service before the billing relationships and/or rates/charges are known.

Figure 7:
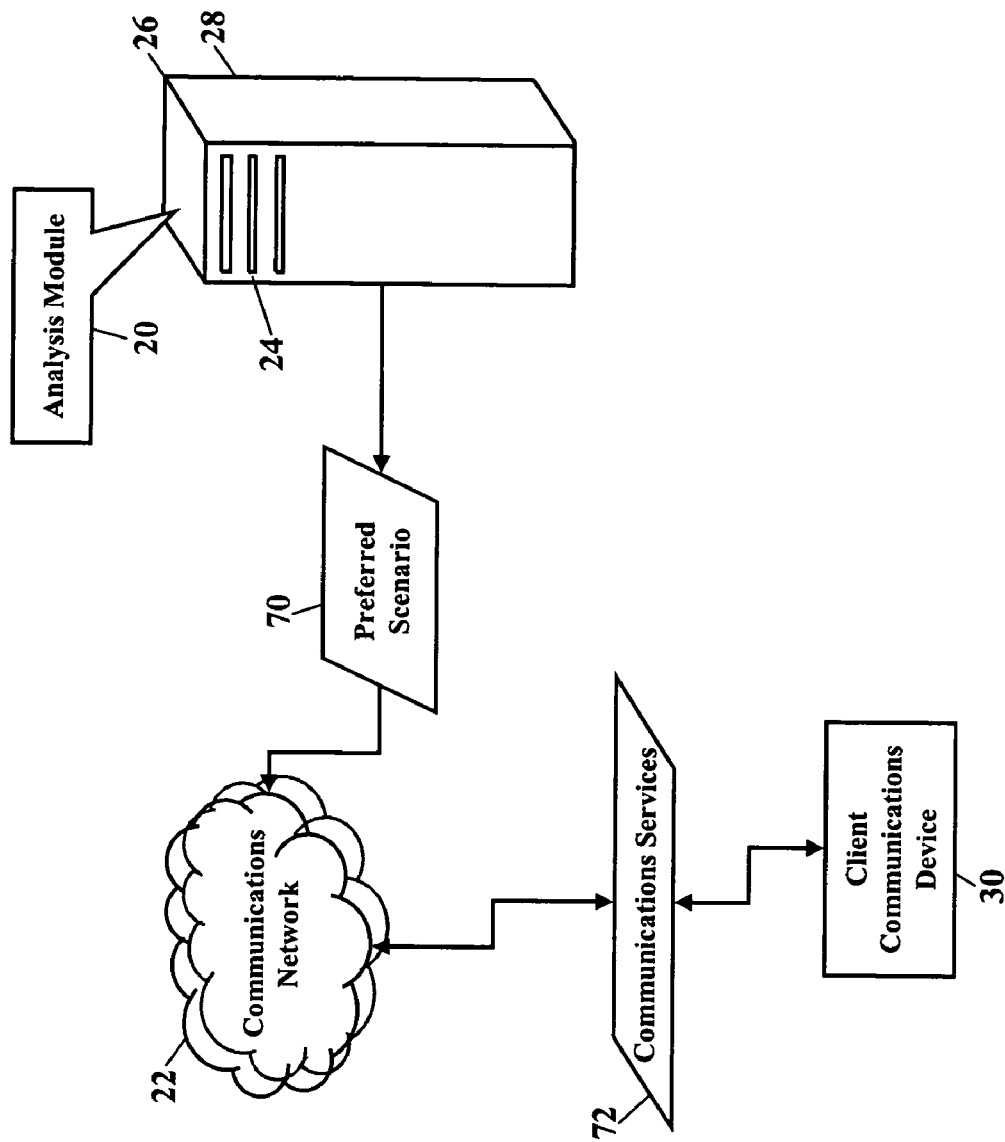
FIG. 7 is a schematic illustrating the preferred scenario.

FIG. 7 is a schematic illustrating the preferred scenario 70. The Analysis Module 20 determines how data is optimally segmented, dispersed, manipulated, and then reassembled to fulfill the request for communications service (shown as reference numeral 32 in FIG. 1). The preferred scenario 70 reflects the best-available routing, and/or the best-available transformation/formatting, that provides the requested communications service(s). The preferred scenario 70 may include instructions/commands to other computer devices to provide the requested communications service according to the preferred scenario. The preferred scenario 70 may also include reservations that instruct computer devices to expect certain data and/or to open/reserve routing links/channels. After the preferred scenario 70 is known, the requested communications service 72 is then provided to the client communications device 30.

Figure 8:
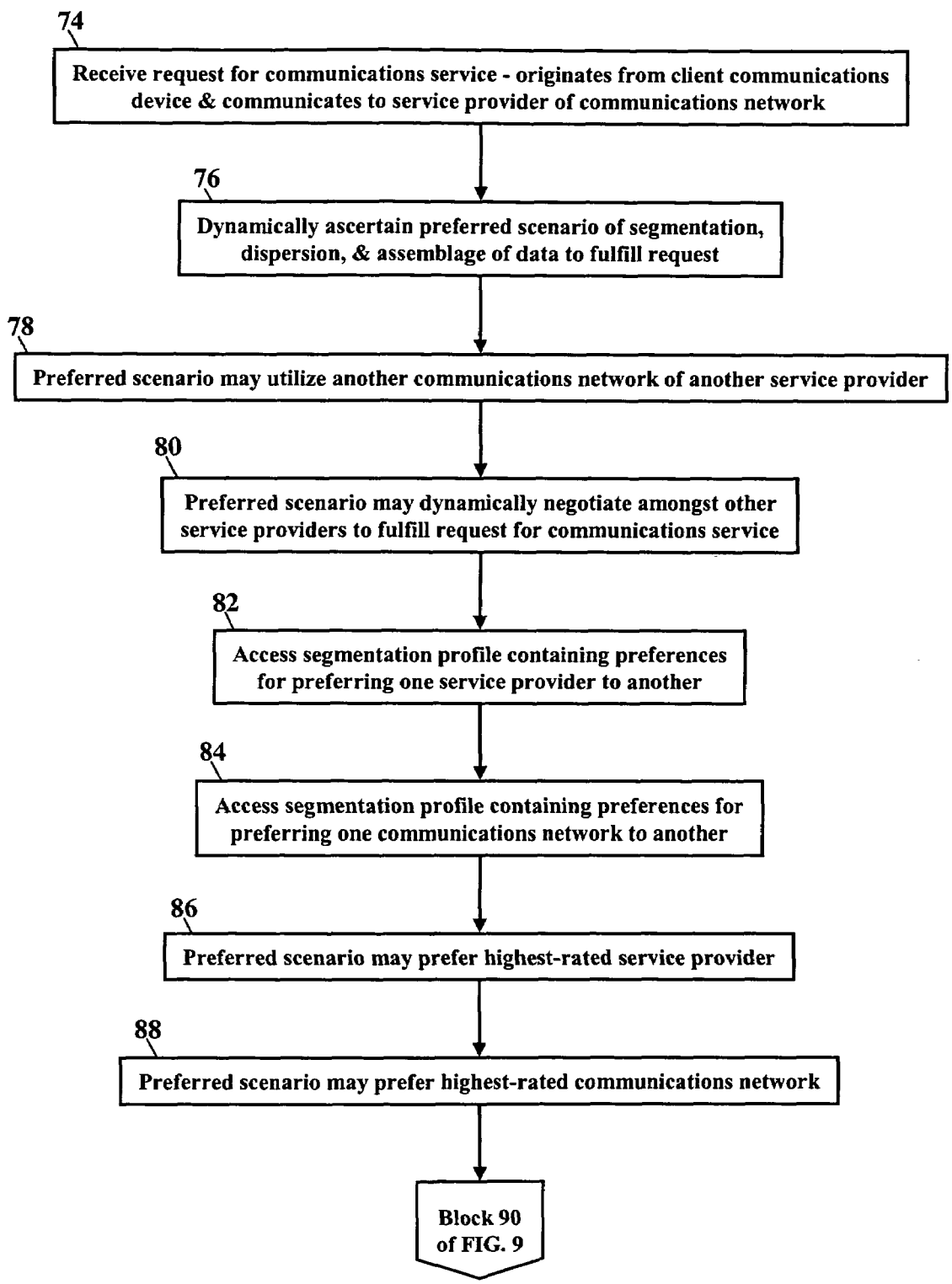

FIG. 8 is a flowchart illustrating a method of providing communications services. A request for communications service is received (Block 74). The request for communications service originates from a client communications device and communicates to a service provider of a communications network. A preferred scenario of segmentation, dispersion, and assemblage of data is dynamically ascertained to fulfill the request (Block 76). The preferred scenario may utilize another communications network of another service provider (Block 78). The preferred scenario may dynamically negotiate amongst other service providers to fulfill the request for communications service (Block 80). The preferred scenario may access a segmentation profile stored in memory. The segmentation profile may contain preferences for preferring one service provider to another service provider (Block 82) and/or preferences for preferring one communications network to another communications network (Block 84). The preferred scenario may prefer a highest-rated service provider (Block 86) and/or a highest-rated communications network (Block 88) to provide the communications service.

The flowchart continues with FIG. 9. Once the preferred scenario is known, then billing is determined. The segmentation profile is accessed (Block 90) to determine any preferences for billing for the communications service. The segmentation profile may also be accessed for preferences for presenting billing charges from another service provider of another communications network (Block 92). The Service Level Agreement is also accessed (Block 94) to determine any preferences for billing for the communications service. If a single bill is preferred (Block 96), then billing charges are aggregated between multiple service providers of multiple communications networks (Block 98). A single billing statement is also presented (Block 100), and the single billing statement aggregates billing charges from another service provider of another communications network. If, however, individual billings are preferred (Block 100), each service provider separately bills the user (Block 102). Each service provider, then, could submit "micro-bills." Each micro-bill reflects each service provider's portion for providing the requested communications service. The micro-bill may be pennies, or even fractions of a penny, for each service provider's contribution or portion of the requested communications service. When individual billings are preferred, multiple billing statements, from multiple service providers of multiple communications networks, are presented (Block 104). Whether a single billing statement is preferred, or whether individual "micro-bills" are preferred, a credit card may be billed for the communications service (Block 106).

The Analysis Module (shown as reference numeral 20 in FIGS. 1-7) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Analysis Module to be easily disseminated. A computer program product for providing communications services includes the Analysis Module stored on the computer-readable medium. The Analysis Module receives a request for communications service. The request for communications service originates from a client communications device and is communicated to a service provider of a communications network. The Analysis Module dynamically ascertains a preferred scenario of segmentation, dispersion, and assemblage of electronic data to fulfill the request. The Analysis Module then bills for the communications service.

The Analysis Module may also be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method of providing communications services by a computer, comprising:
   receiving a request for communications service at a computer, the request for communications service originating from a client communications device and communicated to a service provider of a communications network;
   communicating the request for communications service to other service providers;
   receiving an availability message at the computer from at least one of the other service providers, the availability message describing what routing paths are immediately available and what bandwidth is immediately available along each routing path;
   analyzing the availability message at the computer to dynamically ascertain a preferred scenario of segmentation, dispersion, and assemblage of electronic data to fulfill the request for communications service;
   determining a subcontracted processing service is required from a different service provider;
   grouping together packets of data that require the subcontracted processing service from the different service provider;
   subcontracting the grouped together packets of data to the different service provider to receive the subcontracted processing service; and
   receiving a subcontracted result of the subcontracted processing service; and
   billing for the communications service.

2. A method according to claim 1, wherein analyzing each availability message comprises utilizing another communications network of another service provider.

3. A method according to claim 1, wherein analyzing each availability message comprises dynamically negotiating amongst the other service providers to fulfill the request for communications service.

4. A method according to claim 1, wherein analyzing each availability message comprises accessing a segmentation profile that comprises preferences for preferring one service provider to another service provider.

5. A method according to claim 1, wherein analyzing each availability message comprises accessing a segmentation profile that comprises preferences for preferring one communications network to another communications network.

6. A method according to claim 1, wherein analyzing each availability message comprises preferring a highest-rated service provider to provide the communications service.

7. A method according to claim 1, wherein analyzing each availability message comprises preferring a highest-rated communications network to provide the communications service.

8. A method according to claim 1, further comprising aggregating billing charges between multiple service providers of multiple communications networks.

9. A method according to claim 8, further comprising presenting a single billing statement, the single billing statement aggregating billing charges from another service provider of another communications network.

10. A method according to claim 1, further comprising presenting multiple billing statements from multiple service providers of multiple communications networks.

11. A method according to claim 1, further comprising billing a credit card for the communications service.

12. A method according to claim 1, further comprising accessing a segmentation profile comprising preferences for billing for the communications service.

13. A method according to claim 1, further comprising accessing a segmentation profile comprising preferences for presenting billing charges from another service provider of another communications network.

14. A method according to claim 1, further comprising accessing a Service Level Agreement stored in memory, the Service Level Agreement defining preferences for billing for the communications service.

15. A computer program product comprising a computer readable medium storing processor executable instructions for performing a method, the method comprising:
   receiving a request for communications service, the request for communications service originating from a client communications device and communicated to a service provider of a communications network;
   communicating the request for communications service to other service providers;
   receiving an availability message from at least one of the other service providers, the availability message describing what routing paths are immediately available and what bandwidth is immediately available along each routing path;
   analyzing the availability message to dynamically ascertain a preferred scenario of segmentation, dispersion, and assemblage of electronic data to fulfill the request for communications service;
   determining a subcontracted processing service is required from a different service provider;
   grouping together packets of data that require the subcontracted processing service from the different service provider;
   subcontracting the grouped together packets of data to the different service provider to receive the subcontracted processing service; and
   receiving a subcontracted result of the subcontracted processing service; and
   billing for the communications service.

16. A computer program product according to claim 15, further comprising instructions for dynamically negotiating amongst the other service providers to fulfill the request for communications service.

17. A computer program product according to claim 15, further comprising instructions for presenting a single billing statement that aggregates billing charges from another service provider.

18. A system, comprising:
   means for receiving a request for communications service, the request for communications service originating from a client communications device and communicated to a service provider of a communications network;
   means for communicating the request for communications service to other service providers;
   means for receiving an availability message from at least one of the other service providers, the availability message describing what routing paths are immediately available and what bandwidth is immediately available along each routing path;
   means for analyzing the availability message to dynamically ascertain a preferred scenario of segmentation, dispersion, and assemblage of electronic data to fulfill the request for communications service;
   means for determining a subcontracted processing service is required from a different service provider;

means for grouping together packets of data that require the subcontracted processing service from the different service provider;

means for subcontracting the grouped together packets of data to the different service provider to receive the subcontracted processing service; and means for receiving a subcontracted result of the subcontracted processing service; and means for billing for the communications service.

19. A system according to claim 18, further comprising means for dynamically negotiating amongst the other service providers to fulfill the request for communications service.

20. A system according to claim 18, further comprising means for presenting a single billing statement that aggregates billing charges from another service provider.

\* \* \* \* \*